United States Patent [19]
Brunkow et al.

[11] Patent Number: 5,879,165
[45] Date of Patent: Mar. 9, 1999

[54] METHOD FOR COMPREHENSIVE INTEGRATED ASSESSMENT IN A COURSE OF STUDY OR OCCUPATION

[76] Inventors: Brian Brunkow, P.O. Box 750442, Topeka, Kans. 66675-0442; Charles E. Kurzhal, 212 N. Lake, Sioux Falls, S. Dak. 57104

[21] Appl. No.: 618,752

[22] Filed: Mar. 20, 1996

[51] Int. Cl.⁶ .................. G09B 3/00; G09B 7/00
[52] U.S. Cl. ......................... 434/322; 434/323
[58] Field of Search .................... 434/322, 323

[56] References Cited

U.S. PATENT DOCUMENTS 5,692,906  12/1997  Corder .................... 434/156

*Primary Examiner*—Robert A. Hafer
*Assistant Examiner*—John Edmund Rovnak
*Attorney, Agent, or Firm*—Bruce J. Clark

[57] ABSTRACT

A method using a computer for creating and comprehensively analyzing in an integrated manner a test and course of study or job performance, assessing multiple transferrable skills within the context of course competencies at the individual test assessment level, comprising the steps of selecting a desired taxonomy system having a plurality of taxonomy items defining abilities relating to learning, performance or achievement pertaining to the course of study, storing in memory an assessment item, the proposed answers, and the correct answer, for each assessment item, storing in memory the appropriate taxonomy items in the taxonomy system that pertain to the abilities which the respective assessment item addresses, repeatedly storing in memory a new assessment item, the appropriate taxonomy items, and appropriate proposed and correct answer for each assessment item, to create an entire test of a common variety (multiple choice, essay, performance) and so as to allow retrieval of all answers and coded information for each assessment item, analyzing the test by generating a report showing the relationship between the preselected taxonomy items and each assessment item to which the taxonomy items are assigned.

7 Claims, 7 Drawing Sheets

METHOD FOR COMPREHENSIVE INTEGRATED ASSESSMENT IN A COURSE OF STUDY OR OCCUPATION

BACKGROUND OF INVENTION

The present invention relates to computer programs used by educators and employers to write tests, analyze and track results.

In particular, the invention is a method in the form of a computer program that facilitates the creation of tests having one or more assessment items, i.e. questions, used for analyzing training, a program of study, job, job performance, or performance criteria of one or more individuals that uses a comprehensive coding system and method for tracking learner successes and allows for integrated assessments using a taxonomy system with taxonomies and codes and/or reference items in relation to each test assessment item.

Several major trends have been and continue to emerge in the education and employment assessment fields. In particular, there has been an increasing emphasis on criterion referenced tests. Criterion referenced tests are those tests having questions, or assessment items, designed to demonstrate a specific ability. Criterion reference testing developed from a recognition that past performance is sometimes the best predictor of future performance. Criterion reference testing may supplement, augment or replace aptitude tests.

For example, a student in a photography class might be asked as one question on a test "What is the difference in light intensity as the light source is moved towards or away from the subject." The answer, pertaining to the inverse square law, would relate to the criteria, that "Student can apply the inverse square law using a single light source." In the employment domain, the criteria for a test item might be "Employee can set up a slicing machine to slice meat to a predetermined thickness." Each statement is a criterion that is an ability.

These types of tests are distinguished from achievement tests in that, contrary to achievement tests that compare individuals achievements in a certain subject area, they are a more absolute measurement of the individual's mastery of a course compentency, i.e., the criterion reference approach. The present invention codes competencies for specific criterion.

Criterion referenced testing becomes significant also as the Americans with Disabilities Act and other similar state, federal and regulatory bodies of law, are followed by employers to assure compliance. In particular, insofar as the ADA is concerned, applicants with certain pre-existing conditions must be fairly screened in the job interview process and in the advancement process. The need for a computer program that allows the individual employer to create assessment items in advance of the job interview, each of which assessment item is integrated with an objective criterion or ability required, such as a competency code and taxonomies, discussed later, allows the ability to more uniformly and fairly examine applicants. Each job, thus, has a certain number of criteria that needs to be met, and establishing these criteria, examining the same and integrating the responses and analyzing the same with competency codes and taxonomies, discussed later, significantly improve the probability of a fair, non-discriminatory treatment of applicants and employees. Job descriptions are prepared that identify essential job duties and that specify the required abilities to perform these tests.

Most jobs require certain skills as basic abilities, transferable skills, along with the specific vocational skills that are required of the effective worker.

While the invention is not limited to its use in education and employment, it is significant to note that the two fields increasingly become interrelated as the educational system moves towards testing based on criterion referencing. The prior art lacks an integrated assessment process. The coding system in the invention allows for an integrated assessment by analyzing several taxonomies within each test item and tracking learner successes with respect to each taxonomy to discover the strengths and/or weaknesses of the learner in that area and correlate them to task competencies and/or duty competencies. While computer programs are available to assist teachers to prepare tests, no program provides a method for creating comprehensive criterion referenced testing using a taxonomy system, competency codes, task importance, skill levels, and references to source information. None has offered any means to assess or analyze transferable skills that are taught, practiced, and acquired in a course of study, training program or job while assessing the referenced criterion at the assessment level.

It is important that educators and employers be able to create their own tests of this kind in the field according to their needs and objectives. Known existing programs for creating tests are very limited, non-comprehensive and primarily allow for preparing the individual assessment items and recording each in their own record in a database only with no comprehensive taxonomy system using multiple taxonomies, or ability to analyze the quality of the test within the context of such taxonomy system and using codes, nor any ability to meaningfully track a testee's responses within the comprehensive taxonomy and code system. The invention also performs this analysis according to each assessment item.

The taxonomy system in the invention is comprised of taxonomies that together make up the broad range of preferred behaviors that are intended to be assessed, such as working with data, working with people, working with things, reasoning, math, language, etc. Another taxonomy system may instead be cognition, psychomotor, affective, working with computers. In each of these the testee may show different behaviors. The invention then tracks and analyzes the results according to the taxonomies and other codes with each question or assessment item to provide an analysis or profile data within a true criterion referenced framework.

The inventive process also includes a reference for each assessment item indicating a reference source of material on which the question is based, i.e., the reference source for learning the subject material. In an employment setting it might reference a particular job analysis previously done. This also allows one then to determine whether what is being assessed has been taught. For example, if a specific item of reference material is not shown in a list of references, then that particular reference item may not be being taught, or covered in the course.

The process also allows for the test creator to input for each assessment item a task importance code for the particular competency being assessed, in order to provide a rating apart from the skill required to successfully complete the test item that rates the importance of the duty that the test item is qualifying.

Moreover, the process allows for a special instruction to be inputted, restored and retrieved with each test item. The special instruction remains with the test item whenever the test item is retrieved from the database, in essence coupled to the test item. The special instruction provides a list of tools or other materials that are to be used as auxiliary materials for that particular test item, by test item number. This allows the course/test matter to print as a cover to the test the auxiliary materials needed to take the test.

The process also allows for a task description statement step to be inputted with each assessment item that is essentially a shorter paraphrase of the overall task that the assessment item addresses. There may be several different assessment items dealing with the same task item. Thus the test creator is allowed to create a course of study for that particular task by retrieving all test assessment items for that task. Of course a manager can enter the test items and use the program to search the relevant codes to develop lessons from the details within the test items.

The process also provides for defining and inputting a skill level code for each assessment item.

Still further, the invention allows for inputting an occupational code for each individual assessment item so as to recall assessment items and all particular coupled information, by occupational cluster code or subgroups within the cluster code.

The invention also allows the merging or splitting of custom test files for a particular individualized instruction, i.e., test creator manually or individually selecting the required codes for the particular required individualized instruction. In particular, the computer program includes the steps of automatically creating individualized assessment and individualized instruction in areas in which a less adequate assessment is achieved.

The inventive process also allows for individual course/job competency files to be created and maintained on an ongoing basis to record competencies from many tests. Moreover, the assessment item is coded as either multiple choice, essay style (short or long answer) or analytical performance. These are categorized as either passive or active assessments. The individual competency files then are analyzed in the process to track the passive or active assessments for each competency, and their respective responses, to determine in the individual's competency file his or her performance. If an individual shows higher performance in passive (multiple choice) questions than in active (essay), then one can differentiate the individual's specific ability with respect to that competency.

The object of the invention then is to create a method using a computer for creating and comprehensively analyzing in an integrated manner a test and course of study or job performance, with the ability to plan a course of study that instructs and assesses multiple transferable skills within the context of course competencies at the individual test item assessment level.

Other objects and features of the invention and the manner in which the invention achieves its purpose will be appreciated from the foregoing and the following description and the accompanying drawings which exemplify the invention, it being understood that changes may be made in the specific method and apparatus disclosed herein without departing from the essentials of the invention set forth in the appended claims.

DESCRIPTION OF THE PREFERRED EMBODIMENTS AND PROCESS

Figure 1:
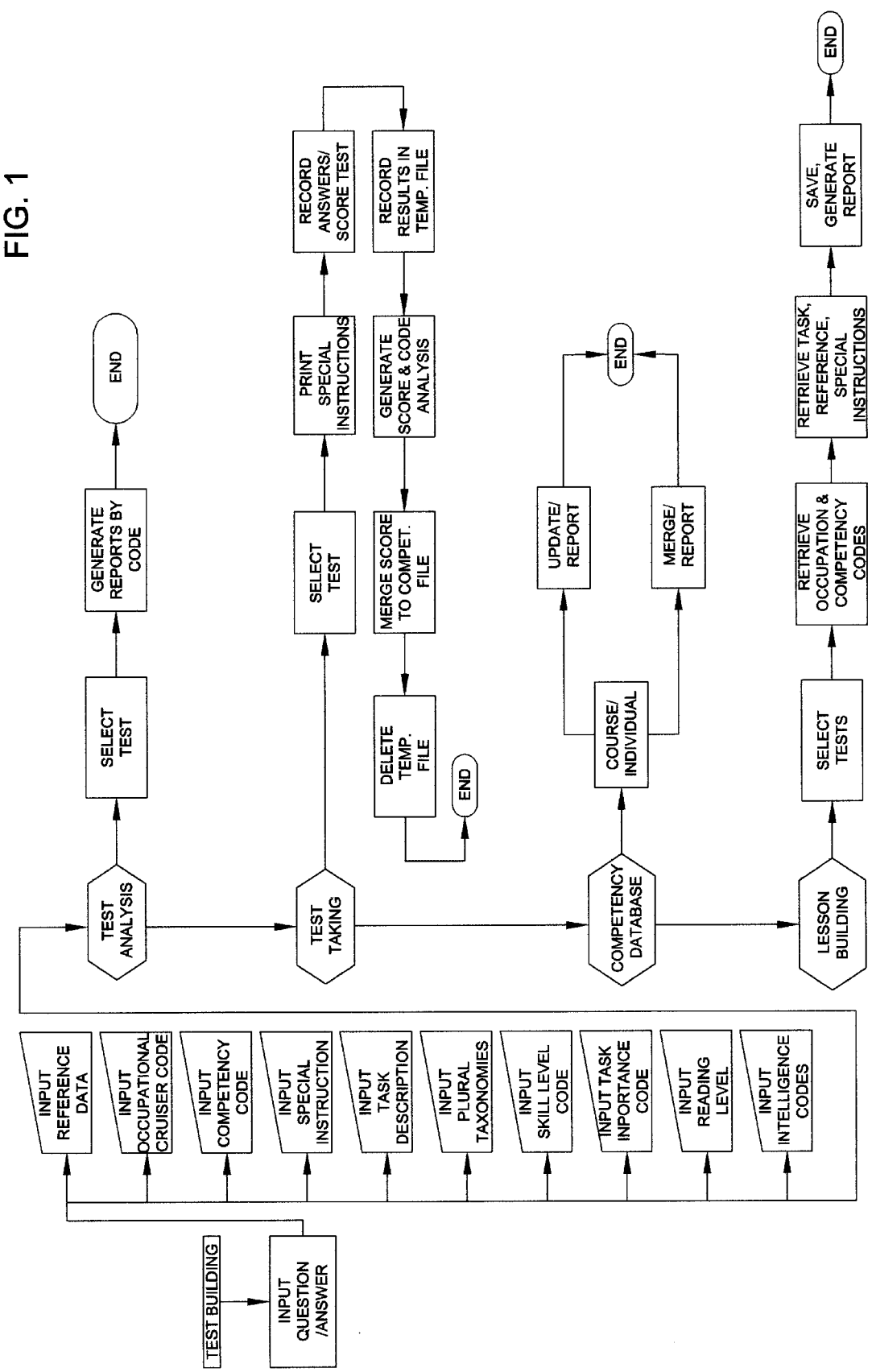
FIG. 1 shows the general flow chart for the process.
Figure 2:
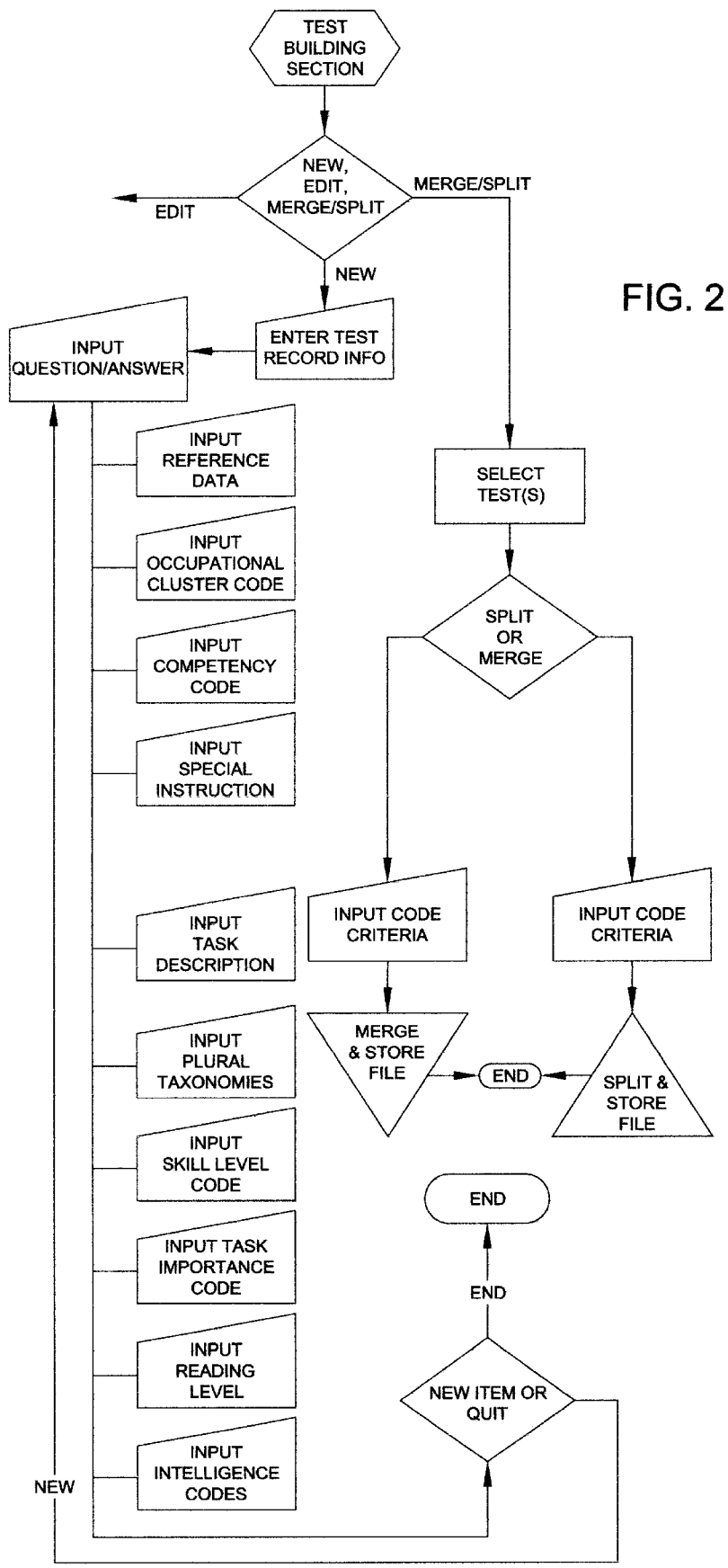
FIG. 2 shows the more detailed sequence of steps for the test building process shown in FIG. 1.

The preferred process is referred to principally in the flow chart shown in FIG. 1. The computer program involved is, in the preferred mode of operation, one that operates on a standard MS-DOS™ based personal computer based system, networked or otherwise. The preferred apparatus is a 286 or higher version (386, 486, Pentium™ etc.) processor system although even the relatively old 8088 based systems will support the program. The method as designed envisions that many school systems and businesses will have older processor based systems, even though the current state of the art involves Pentium™, Power PC and equivalents. The program is also envisioned to be operated on Windows™, and in other operating systems and computers including Macintosh™. The basic system requires a hard disk drive of any standard size available, a minimum of 5 megabytes. The required memory is 640K with no extended or expanded memory. The typical CRT monitor and printer of any kind are also used.

The overall flow process as shown in the flow chart shown in FIG. 1. Subprocess steps for each of the primary steps in FIG. 1 are shown in more detailed form in separate FIGS. 2 through 7.

At the outset, one simply assures that the computer is on and calls up the program from the disk drive. The first screen having meaningful steps shown is that in Appendix 1. As depicted, the user desiring to build a test selects the test building (management) section and either edits (or merges) or creates a new test.

Assuming a new test is to be created, the user first selects whether it is a multiple choice, essay or performance test. A multiple choice test, principally a passive test, simply allows the test creator to create a test being either a true/false variety or one having several answers, only one of which is usually correct. Essay may be short answer or long answer, and includes fill in the blank. It is of the active assessment variety.

The performance test is one where the test giver is recording the performance of usually a series of steps taken to perform a task by the test taker. This might be the employer observing an employee performing the task to assure that all steps required for the task are performed. Performance tests are active assessment tests.

This active/passive information is used later in a number of ways to analyze the results based on passive or active assessment and in other ways as will be seen.

All assessment items (test questions) in each test are envisioned in the preferred mode of being of only one type, i.e., a separate test might have a number of assessment items or questions but they will all be of the same type, i.e., all multiple choice, all essay or all performance.

Once the type of test is selected, in the preferred mode the next principal screen is displayed, essentially in the form shown in Appendix 2, where one next inputs the actual test question, proposed answers and correct answers in separate fields (although in multiple choice, the correct answer is inserted later). In Appendix 2, the sample question is shown relating to incident light, with four possible answers. The specific test question is recorded in a specific data field so as to allow it to be stored into memory separately. The fields are referred to throughout as containing separate storable and retrievable items of data. In a different recordable and retrievable data field is inserted the answer for the test question.

Unless otherwise referred to herein, inputting refers to retrievably storing in storage memory means specific data; generating a report refers to printing on printing means, or displaying on CRT terminal means or generating a report for display in any peripheral, data for files retrieved from memory in a desired format.

The preferred process continues with the following steps:

Next, input the reference information indicating the educational or other job analysis reference on which the test item and answer are selected or based, to provide the source for training or learning.

Next, input the desired occupational code to which the assessment item references. Once such code is the occupational cluster code utilized by the U.S. Department of Labor in the *Dictionary of Occupational Titles* 3. This cluster code is also referred to as occupational categories, divisions and groups. It is intended to represent in code form many of the desired occupations to which the assessment item relates.

Next, input a preselected competency code coding the specific competency required to do the task that is being assessed in the test question. The competency code can be predesigned by the test creator but in the preferred mode these codes are usually codes representing such things as duties within a job, or "demonstrate an understanding of . . . " or "demonstrate an ability to use . . . " or "demonstrate skill in handling . . . ", etc. These competency codes, in the preferred mode, match the course competency codes referred to later.

Next, input a special instruction keyed to the assessment item as an integral part of the test item, listing in textual form the tools (protractors, compasses, graphs, rulers, music, etc.) and other materials that are to be used as auxiliary materials for that particular test item or other special directions. The screen showing the format for the special information is shown in Appendix 3. A cover page to the test can then later be printed, by assessment item number, the various tools and materials needed to take the test. The special instruction for that particular item moves with the test item and is thus keyed to the assessment question and wherever the test item is recalled from memory so that if various tests are created with that assessment item, the special instruction set is always coupled and retrievable from memory with the assessment item. It is also used in the lesson plan/study guide section to produce a tool list for lesson plans and study guides.

Next, input into a separate field the predefined task description that is a paraphrased description of the task being assessed by the assessment item. Several assessment items in the same test may have the same task description which may vary from the course/job competencies. Consequently, this allows the test creator to create study sheets, lesson plans and study guides from the test items that are designed to address specific tasks, simply by calling up a task description and all of the test items coupled to that test description. Moreover, the study guides are designed to always print the task descriptions and competency codes so as to enable one to know what particular task he or she is studying for, along with other reasons.

Next, select the taxonomy system and input the taxonomy codes. Taxonomy systems can be of any predefined type of interest to the test creator that comprise classes of behavior to be tested for and developed. The system is a plurality of taxonomies that are together a comprehensive categorical system for classifying behaviors using a range of codes (descriptions) for measurement thereof. In the preferred mode, using the U.S. Department of Labor Dictionary, the categories for taxonomies are "data", "people", and "things", along with "reasoning", "math", and "language", and are each included in separate fields with their own range of codes to reflect the type of behaviors in that particular taxonomy. The preferred screen format is shown in Appendix 4. For example, the taxonomy "Data" might include a range of values of 1–10. The number inserted would depend on whether the assessment item is considered to be one dealing primarily with "Data." The same assessment item might have a different range of values for the taxonomy "People" and the code inserted for "People" would depend on whether the test giver considered the assessment item to be more directed to "People" skills for example. Also included is a separate field for user-defined taxonomy of any kind particular or desirable to the educational institution, educator or employer uses of the program.

Next, input a skill level rating for the particular task for that particular population or occupation, preferably a nonlinear rating system. This skill level is, in the preferred mode, nonlinear. For example in the preferred mode, the scale would be one having a scale of 1, 2, 4, 6, with 6 being the highest skill level so as not to overrate or overweight those individuals or individual scores that are performing well. These overall scores may be used to compare results amongst performances and the nonlinear weighting system allows one to more fairly or accurately rate the value of performing at a higher level. A percentage score is generated from this also showing the successes (successful answers) and resulting overall percentage.

Next, input a task importance code utilizing a predetermined code to indicate the importance of the task being assessed for the particular occupation involved, preferably nonlinear similar to that of the skill level, preferably 1, 2, 4, 6 with 6 being given the value for the more important tasks. Consequently a test creator can determine whether the more important tasks are being performed at minimum. From this also is created a percentage score. For example, a test having four questions, each having an importance level of 1, 2, 4, 6, is taken and the test taker misses the least important question out of the four, his score remains 12 out of 13, 92%. Consequently missing 25% of the test questions still results in a relatively high score. Thus, the skill level and task importance code, while seemingly similar, are in fact meaningfully different. The skill level determines the level of skill involved with the task (which is tracked in the competency file); the task importance indicates that, while the level of skill may be high, it is not of significant importance in performing the task. In an educational and/or career setting and environment, and in a society recognizant of the value of certain training, one can determine whether such coding and tracking allows one to determine relative worth versus relative skill of the assessment item, i.e., whether the assessment item that was incorrectly answered was of significant value.

Next, input a reading level code based on a predetermined range of codes, to rate the reading level to which the assessment items are directed. This allows the test giver to determine, for instance, whether a certain individual is having difficulty reading test questions at a certain reading level. This may indicate more of a reading problem rather than a performance problem.

Next, input intelligence types to which the question is primarily directed. to a screen to input what are commonly referred to as the intelligence types: "linguistic", "logical", "spacial", "bodily" (kinesthetic), "musical", "intrapersonal", "interpersonal". The user inserts an X or leaves blank at each one to indicate whether the assessment item addresses the particular intelligence, i.e., preferred learning styles or temperaments. No range of values is required for each one. Appendix 5 shows the screen in the preferred mode.

Next, input the correct answer if the test item is a multiple choice question, unless already inserted earlier.

At each step in the process, or at any time in the process, the information inserted in the field is stored in memory, preferably on the hard disk drive.

Figure 3:
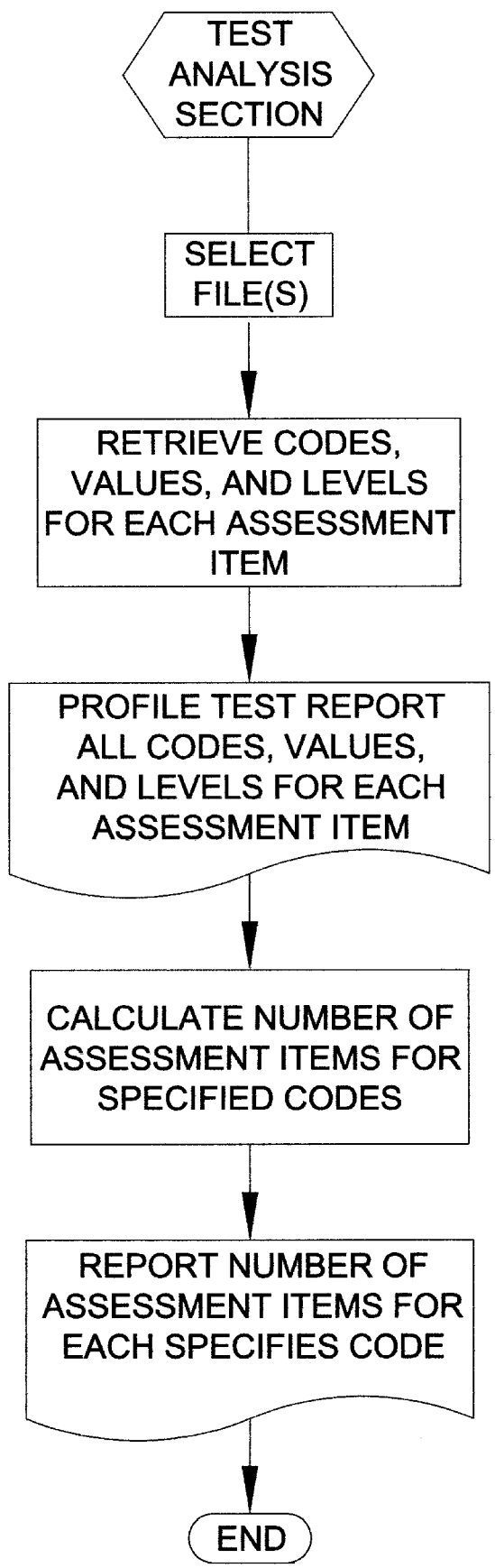
FIG. 3 shows the more detailed sequence of steps for the test analysis process shown in FIG. 1.

One then proceeds to the next test question and repeats the process, or if there are no further test questions, the test is ready to be analyzed (or if analyzed previously, proceed to the test taking and scoring process or to the database creation process or lesson building process). If there are no further questions, the test is stored in memory. The test analysis process, shown in more detail in the preferred mode in FIG. 3, shows the process for analyzing the test in a comprehensive manner using the various codes discussed to determine the quality of the test in a comprehensive manner. Here the user selects the test from the test file database by retrieving the test from memory.

First, in the preferred mode, the user generates a report that lists all codes for each individual assessment item, as shown in Appendix 6. To one familiar with the selected taxonomy system and the codes and skill levels for example, the apparent value of assessing the test's quality in this manner becomes apparent.

The user then generates a report comprising a comprehensive tally of all of the codes that exist within the selected test file. This likewise shows the different codes, skill levels, reading levels, and taxonomies, tested for throughout the entire test. Such a report is shown in Appendix 7.

If any revisions are needed to the test based on the test analysis, the test creator can then edit any assessment items in the test building section.

Figure 4:
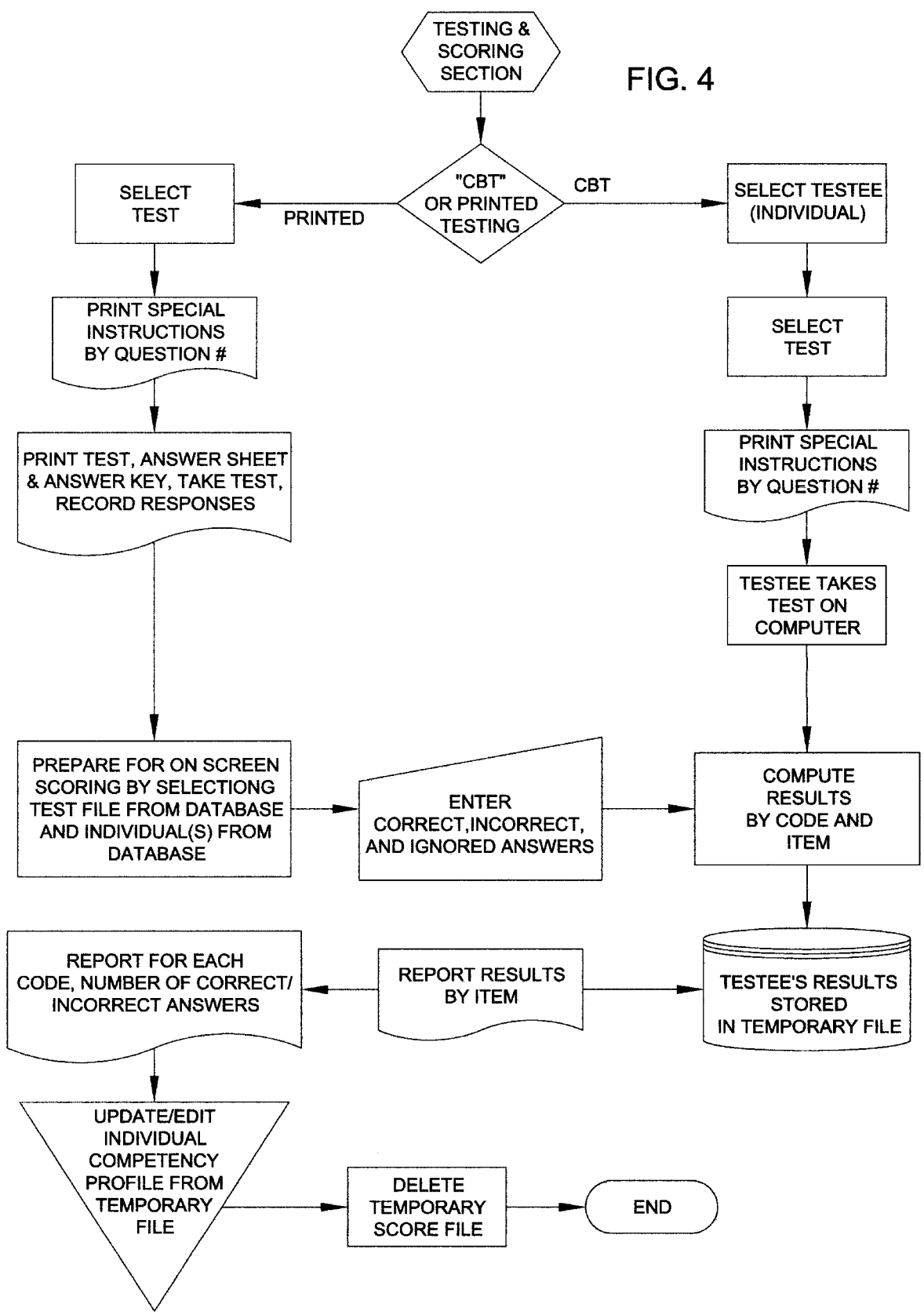
FIG. 4 is the more detailed sequence of steps showing the test taking process of FIG. 1.

Next, in the preferred mode, the test is taken, as shown in FIG. 4. First, one selects taking the test on computer as a "CBT" test (computer based test), or in the alternative as a printed test. If a CBT test process is selected, the individual testee is selected (or create a new file for the individual with name, age, etc). Next the test is selected. (However, certain advantages may be obtained by reversing the latter two steps, i.e. selecting the test before selecting the testee). Then, special instructions are first printed out (or displayed) prior to giving the test identifying the materials or special instructions needed to take the test. Each answer is then recorded on the computer and stored into memory in a temporary file.

The test may be taken, in the alternative, as shown in FIG. 4, as printed and taken by hand with the answers (responses) inserted manually into the computer to be scored. In the latter mode, the test can become essentially a performance type test such as where an employee is observed on the job, evaluated, with appropriate responses or observations asserted at each assessment stage, and, as opposed to the CBT test, allows the tester to "ignore" certain questions during the test taking and scoring process. Whether it is the CBT or the printed test, the assessment items are dealt with one by one, answered by either the testee or recorded by the test giver.

The computer retrieves from the test file database the answers to the questions and compares them to the testee's answers in the temporary file and records the results (successes) in the temporary file. A score sheet and code analysis are then printed showing the testee's results on each question in relation to the code such that the results of the testing show with regard to each taxonomy and other code(s) throughout, the performance level. Appendixes 8, 9, 10 show the preferred reports. The testee's results from the tests stored in the temporary file are then merged and added to the testee's permanent individual competency profile file and stored in memory so as to provide a data file with regard to each of the codes used throughout the course, education or career, and are stored so as to retrieve and track independently the results and performance according to responses to passive or active questions and to do so distinctly from the taxonomies. The temporary file is then deleted.

Figure 5:
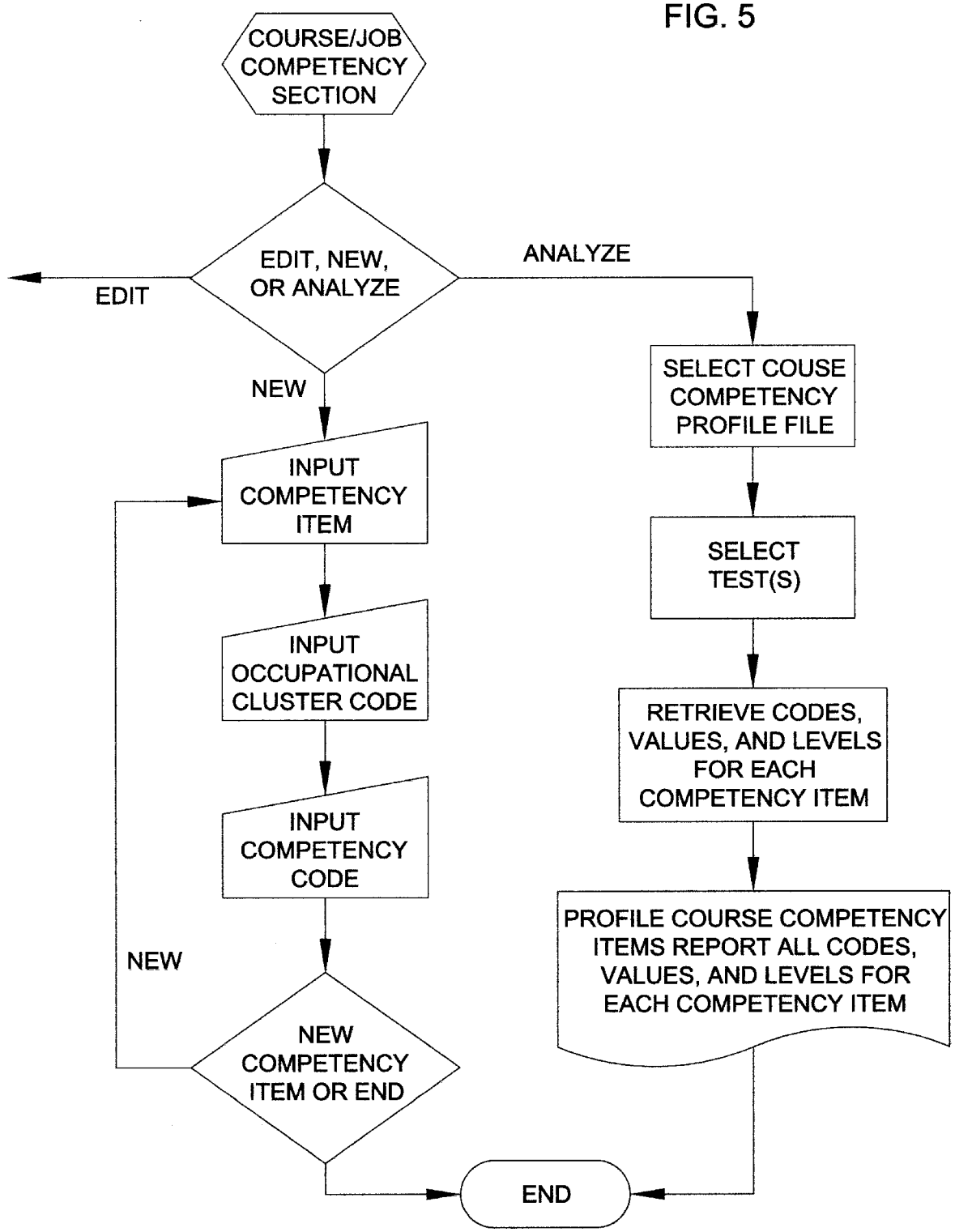
FIGS. 5 and 6 are the more detailed sequence of steps showing the course/job competency database and individual competency database recording and retrieving sections, respectively, of FIG. 1.
Figure 6:
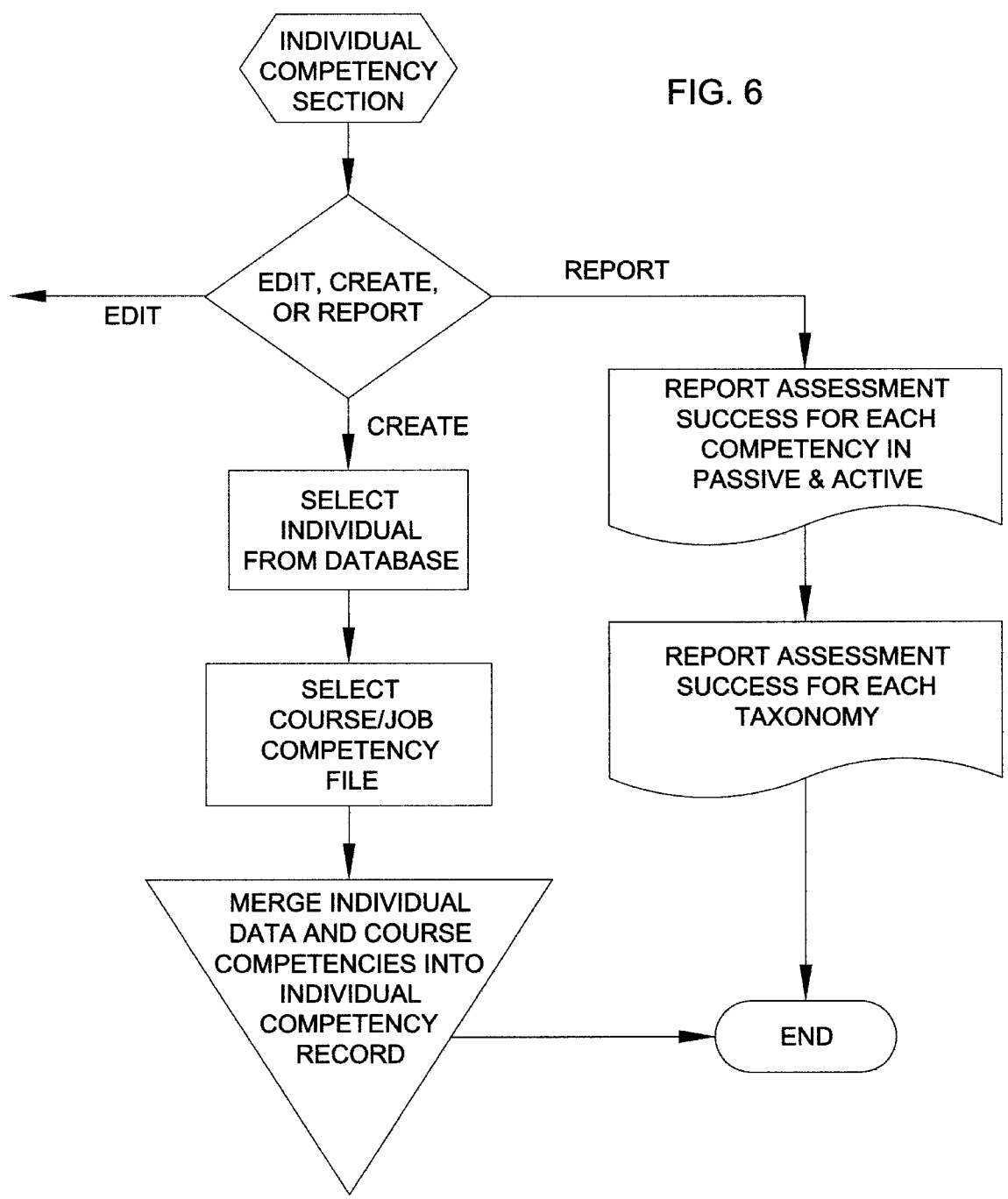

In the preferred mode, the additional steps of recording and creating a competency database section are shown in FIG. 5. Here the user, typically the teacher or employer, creates a course/job competency first, then an individual competency database for individuals, as desired. This allows the user to create a course competency showing the objectives of the course and to determine whether all of the tests given during the course will meet the objectives in the end. Likewise, the individual competency database process, FIG. 6, allows tracking of the individual's progress as it pertains to the respective course.

Next, additional steps in the preferred mode include inputting the competencies required for the course, inputting the occupational code involved for the competency, and doing so for each competency code and occupational code in the same format as the test item input of these codes used in the test building process. These are retrievably stored in memory. Analyzation involves the additional steps of selecting the course file, retrieving from the memory the test or tests to analyze (which may be all tests during the course or over a selected time span), generating a report of all codes, values and levels for each competency item along with the passive/active combination for each assessment item.

Next, the additional steps of updating and analyzing the individual competency database (FIG. 6) are performed to provide a process for tracking the individual learner's development as it pertains to each course competency/occupation job code. These steps are comprised of the steps of creating an individual competency database if one is not already created, selecting the individual competency database created, selecting the respective course/job competency file, merging the individual data and course competencies from the course competency file into an individual competency file, record and store in memory where each record has fields to retrievably store individual scores in each competency, taxonomy, and occupational cluster code (or other occupation code). Analysis involves the additional steps of generating a report showing successes (learner correct responses) for each competency according to active/passive distinctions, then reporting assessment successes for each taxonomy, then generating a report showing successes according to occupational cluster codes.

Figure 7:
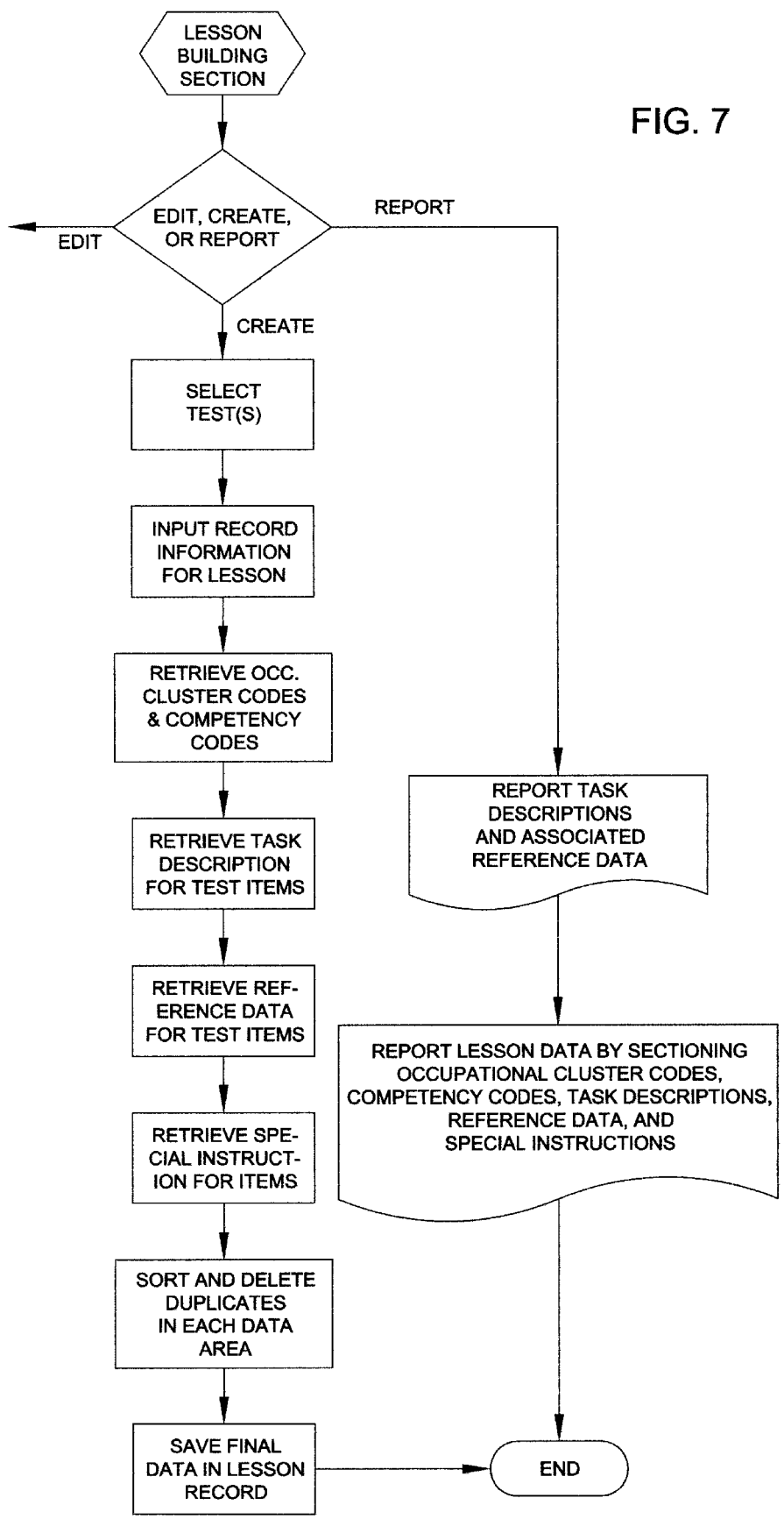
FIG. 7 is the more detailed sequence of steps showing the lesson building process of FIG. 1.

FIG. 7 shows the remaining steps for utilizing the program to develop a lesson or course (or training) plan, comprising the steps of selecting the test file or files pertaining to the respective lesson or course under consideration, retrieving from memory the task descriptions, reference data and special instructions for the assessment items using selected occupational codes and competency codes to create a lesson plan file, then retrievably storing the lesson plan file in memory, generating a report of the tasks and descriptions and the pertinent reference text and special instructions, generating a report showing occupation codes, competency codes, task descriptions, reference data and special instructions.

For example, the user might select all assessment items having to do with the competency code for learning lightwave theory in a physics course by generating a report that shows not only the competency code and the reference data and task descriptions, but also shows the occupation(s) it may be directed to.

In this manner the educator/employer can be best assure that the proper training will have been given for the test items involved.

Consequently, what is shown is a step-by-step process to assure, using the comprehensive set of codes throughout, that the educator/trainer can be best assured the particular competencies, transferrable skills, tasks, skill levels, are not only taught but are tested for.

While there have been shown and described particular embodiments of the invention, it will be obvious to those skilled in the art that changes and modifications may be made without departing from the invention or its equivalent, and, therefore, it is intended by the appended claims to cover all such changes and modifications as fall within the true spirit and scope of the invention.

APPENDIX 1

PC-TEST Main Program Menu

F1 Select Individual And Take A Selected Test
F2 Test File Management Program
F3 Change Data Drive\Path Setup
F4 Analyze Test Data Files
ESC Quit And Exit This Program

APPENDIX 2

Question #1 Press Ctrl-End To Abort This Edit. Answer A

INCIDENT LIGHT IS:

A LIGHT THAT FALLS ON THE SUBJECT.
B LIGHT THAT IS INCIDENTALLY DIFFUSED.
C LIGHT THAT IS HARD IN QUALITY.
D PRODUCES THE SPECULAR HIGHLIGHT.
R #1, PAGE 24

Competency Task Reference Code: 143.A2

APPENDIX 3

Question #1 Press Ctrl-End To Abort This Edit. Answer A

INCIDENT LIGHT IS:

A LIGHT THAT FALLS ON THE SUBJECT.
B LIGHT THAT IS INCIDENTALLY DIFFUSED.
C LIGHT THAT IS HARD IN QUALITY.
D PRODUCES THE SPECULAR HIGHLIGHT.
R #1, PAGE 24

Special Instruction For This Question

APPENDIX 4

Question #1 Press Ctrl-End To Abort This Edit. Answer A

INCIDENT LIGHT IS:

A LIGHT THAT FALLS ON THE SUBJECT.
B LIGHT THAT IS INCIDENTALLY DIFFUSED.
C LIGHT THAT IS HARD IN QUALITY.
D PRODUCES THE SPECULAR HIGHLIGHT.
R #1, PAGE 24

Dictionary of Occupational Title Codes
DATA 3 PEOPLE THNGS RSNG MATH LANG 3 TXNMY 1 TSKIMP 4 SKLVL 4 RDLVL 9

APPENDIX 5

INCIDENT LIGHT IS:

A LIGHT THAT FALLS ON THE SUBJECT.
B LIGHT THAT IS INCIDENTALLY DIFFUSED.
C LIGHT THAT IS HARD IN QUALITY.
D PRODUCES THE SPECULAR HIGHLIGHT.
R #1, PAGE 24

Intelligences Coding (X in block)
LNGSTIC X  LOGICAL    SPATIAL X MUSICAL    BODILY
  INTERPSNL   INTRAPSNL

APPENDIX 6

Overall Analysis of Test me: VICASPLT
Date/Time Printed: 03-17-1996   11:41:27
Test Name: PHOTOGRAPHY CHAMPIONSHIP TEST

| | | Intelligences Coding | | | | | | DOT | | | Codes | | OTHER | | | |
|---|---|---|---|---|---|---|---|---|---|---|---|---|---|---|---|---|
| QN # | CTRC | LNG | LOG | SPT | MUS | BOD | INP | EXP | DAT | PPL | THG | RSN | MTH | LNG | TAX | TSK | SKL | RDL |
| 1 | 143. | X | | X | | | | | 3 | | | | 3 | 1 | 4 | 4 | 9 |
| 2 | 143. | X | X | X | | | | X | 2 | | | 4 | 3 | 5 | 4 | 4 | 9 |
| 3 | 143. | X | X | X | | | | X | 2 | | | 4 | 3 | 2 | 6 | 4 | 10 |
| 4 | 143. | X | X | X | | | | X | 2 | | 1 | 4 | 4 | 4 | 6 | 6 | 10 |
| 5 | 143B | X | X | | | | | | 2 | | | 3 | 3 | 3 | 6 | 4 | 7 |
| 6 | 143B | X | X | | | | | X | 2 | | 7 | 4 | 3 | 4 | 4 | 6 | 8 |
| 7 | 143B | X | X | X | | | | X | 2 | | 7 | 3 | 4 | 4 | 6 | 6 | 12 |
| 8 | 143B | X | X | X | | | | X | 1 | | 1 | 3 | 4 | 2 | 4 | 6 | 11 |
| 9 | 143G | X | | | X | X | | | 2 | 6 | | 2 | 3 | | 6 | 2 | 10 |
| 10 | 143C | X | X | X | | | | X | 1 | 7 | 4 | 4 | 3 | 3 | 4 | 4 | 5 |
| 11 | 143B | X | X | | | | | X | 1 | | | 4 | 3 | 7 | 4 | 6 | 9 |
| 12 | 143B | X | X | | | | | | 1 | | 4 | 3 | 4 | 2 | 4 | 6 | 9 |
| 13 | 143H | X | | | | | | | 3 | | 7 | | 3 | | 6 | 2 | 7 |

APPENDIX 6-continued

Overall Analysis of Test    me: VICASPLT
Date/Time Printed: 03-17-1996    11:41:27
Test Name: PHOTOGRAPHY CHAMPIONSHIP TEST

| QN # | CTRC | Intelligences Coding | | | | | | | DOT | | | Codes | | OTHER | | | |
|------|------|-----|-----|-----|-----|-----|-----|-----|-----|-----|-----|-----|-----|-----|-----|-----|-----|
| | | LNG | LOG | SPT | MUS | BOD | INP | EXP | DAT | PPL | THG | RSN | MTH | LNG | TAX | TSK | SKL | RDL |
| 14 | 143B | X | X | | | | | X | 1 | | 4 | 3 | | 3 | 3 | 4 | 4 | 10 |
| 15 | 143A | X | X | X | | | | | 2 | | | 3 | | 4 | 3 | 2 | 4 | 10 |
| TOTALS: | | 15 | 12 | 8 | 0 | 1 | 1 | 9 | 15 | 2 | 8 | 13 | 0 | 15 | 13 | 15 | 15 | 15 |

APPENDIX 7

Analysis By Code Type on Test File: VICASPLT
Date/Time Printed: 03-17-1996 11:41:27

| Test Name | PHOTOGRAPHY CHAMPIONSHIP TEST |
|---|---|

DATA           0  1  2  3  4  5  6
               0  5  8  2  0  0  0

PEOPLE         0  1  2  3  4  5  6  7  8
               0  0  0  0  0  0  1  1  0

THINGS         0  1  2  3  4  5  6  7
               0  2  0  0  3  0  0  3

REASONING      1  2  3  4  5  6
               0  1  6  6  0  0

MATH           1  2  3  4  5  6
               0  0  0  0  0  0

LANGUAGE       1  2  3  4  5  6
               0  1  6  6  0  0

TAXONOMY       1  2  3  4  5  6  7  8  9
               1  3  4  3  1  0  1  0  0

TASK IMPORTANCE  1  2  4  6
                 0  1  8  6

SKILL LEVEL    1  2  4  6
               0  2  7  6

READING LEVEL  1  2  3  3  4  5  6  7  8  9  10 11 12 13 14 15 16
               0  0  0  0  0  1  0  2  1  4  5  1  1  0  0  0  0

APPENDIX 8

PHOTO CHAMPIONSHIP TEST
Test Date: 03-16-1996
Name: BRIAN BRUNKOW
I.D.:
Grade Level:                                    File Name: BRUB

| INTELLIGENCES | SAMPLE SIZE | CORRECT | PERCENTAGE |
|---|---|---|---|
| LINGUISTIC | 15 | 9 | 60 |
| LOGICAL | 12 | 6 | 50 |
| SPATIAL | 8 | 4 | 50 |
| MUSICAL | 1 | 1 | 100 |
| BODILY | | | |
| INTERPERSONAL | 1 | 1 | 100 |
| INTRAPERSONAL | 9 | 3 | 33 |

| DOT FUNCTIONS | SAMPLE SIZE | CORRECT | PERCENTAGE |
|---|---|---|---|
| DATA CODE 0 | | | |
| DATA CODE 1 | 5 | 3 | 60 |
| DATA CODE 2 | 8 | 4 | 50 |

APPENDIX 8-continued

PHOTO CHAMPIONSHIP TEST

| | | | |
|---|---|---|---|
| DATA CODE 3 | 2 | 2 | 100 |
| DATA CODE 4 | | | |
| DATA CODE 5 | | | |
| DATA CODE 6 | | | |
| PEOPLE CODE 0 | | | |
| PEOPLE CODE 1 | | | |
| PEOPLE CODE 2 | | | |
| PEOPLE CODE 3 | | | |
| PEOPLE CODE 4 | | | |
| PEOPLE CODE 5 | | | |
| PEOPLE CODE 6 | 1 | 1 | 100 |
| PEOPLE CODE 7 | 1 | 1 | 100 |
| PEOPLE CODE 8 | | | |
| THINGS CODE 0 | | | |
| THINGS CODE 1 | 2 | 0 | 0 |
| THINGS CODE 2 | | | |
| THINGS CODE 3 | | | |
| THINGS CODE 4 | 3 | 2 | 67 |
| THINGS CODE 5 | | | |
| THINGS CODE 6 | | | |
| THINGS CODE 7 | 3 | 1 | 33 |

PHOTO CHAMPIONSHIP TEST

Test Date: 03-16-1996  
Name: BRIAN BRUNKOW  
I.D.:  
Grade Level:  File Name: BRUB

| GENERAL EDUCATIONAL DEVELOPMENT | SAMPLE SIZE | CORRECT | PERCENTAGE |
|---|---|---|---|
| REASONING 6 | | | |
| REASONING 5 | 1 | 1 | 100 |
| REASONING 4 | 6 | 3 | 50 |
| REASONING 3 | 6 | 3 | 50 |
| REASONING 2 | | | |
| REASONING 1 | | | |
| MATHEMATICAL 6 | | | |
| MATHEMATICAL 5 | | | |
| MATHEMATICAL 4 | | | |
| MATHEMATICAL 3 | | | |
| MATHEMATICAL 2 | | | |
| MATHEMATICAL 1 | | | |
| LANGUAGE 6 | | | |
| LANGUAGE 5 | | | |
| LANGUAGE 4 | 10 | 7 | 70 |
| LANGUAGE 3 | 5 | 2 | 40 |
| LANGUAGE 2 | | | |
| LANGUAGE 1 | | | |
| TAXONOMY 9 | 1 | 1 | 100 |
| TAXONOMY 8 | 3 | 1 | 33 |
| TAXONOMY 7 | 4 | 3 | 75 |
| TAXONOMY 6 | 3 | 0 | 0 |
| TAXONOMY 5 | 1 | 1 | 100 |
| TAXONOMY 4 | | | |
| TAXONOMY 3 | 1 | 1 | 100 |
| TAXONOMY 2 | | | |
| TAXONOMY 1 | | | |

APPENDIX 9

PHOTO CHAMPIONSHIP TEST

Test Date: 03-16-1996  File Name: BRUB

Name: BRIAN BRUNKOW  
I.D.:  
Grade Level:

| AVG READING LEVEL OF TEST | AVG READING LEVELS - | CORRECT | And | INCORRECT |
|---|---|---|---|---|
| 9 | | 8 | | 10 |
| AVG SKILL LEVEL OF TEST | SKILL LEVEL SCORE | PCT | SKILL LEVEL/TIME SCORE | |
| 4.5 | 36 | 53 | 50.0 | |
| AVG TASK IMPORTANCE OF TEST | TASK IMPORT. SCORE | PCT | TASK IMPORT./TIME SCORE | |
| 4.7 | 40 | 57 | 56.0 | |

APPENDIX 10

PHOTO CHAMPIONSHIP TEST  
File Name: C:\PCT800\tests\VICA95  
Test Date: 03-16-1996  
Name: BRIAN BRUNKOW  
I.D.:  
Grade Level:  Test Type: Random

| | |
|---|---|
| Time Started: | 22:58:07 |
| Time Complete: | 22:59:47 |
| Total Time for Test (Minutes): | 1.7 |
| Minutes per Question: | 0.1 |

APPENDIX 10-continued

PHOTO CHAMPIONSHIP TEST  
File Name: C:\PCT800\tests\VICA95  
Test Date: 03-16-1996  
Name: BRIAN BRUNKOW  
I.D.:  
Grade Level:  Test Type: Random

| | |
|---|---|
| File Question Count: | 124 |
| Question Range (Low–High): | 1–15 |
| Total Questions Selected: | 15 |
| Questions Selected For Test: | 15 |
| Total Questions Scored: | 15 |
| Total Questions Passed: | 0 |
| Number Correct: | 9 |
| Number Incorrect: | 6 |
| Percentage Score: | 60% |
| Total Odd Numbered Questions Scored = 8 | |
| Odd Numbered Questions Percentage Score = 75% | |
| Total Even Numbered Questions Scored = 7 | |
| Even Numbered Questions Percentage Score = 43% | |

What is claimed is:

1. A method for a teacher or other user to systematically create and comprehensively analyze a test, and track results in a course of study or job, using a computer system having display means, memory means, and input means, said test having a plurality of assessment items, comprised of the steps of:

a. The user selecting a desired taxonomy system having a plurality of taxonomies defining classes of behavior relating to learning, performance or achievement pertaining to the course of study or job, each taxonomy having a classification of taxonomy codes defining a range of values;

b. Storing in memory an assessment item;

c. For each assessment item, storing in memory the appropriate taxonomy code for each taxonomy in the taxonomy system that pertain to the abilities which the respective assessment item addresses;

d. For each assessment item, storing in memory the correct answer to each assessment item;

e. Repeatedly storing in memory the assessment item, the appropriate taxonomy codes, and appropriate answers for each assessment item, to create an entire test, and so as to allow retrieval of all answers and coded information for each assessment item;

f. Analyzing the test by generating a report showing the relationship between the preselected taxonomy, taxonomy codes and each assessment item to which the taxonomy codes are assigned.

2. The method in claim 1 including the additional steps of:

a. Retrievably storing in memory for each assessment item a special instruction showing the materials needed to answer the assessment item;

b. Retrievably storing in memory predefined task importance code defining the relative importance of the task being assessed in the assessment item;

c. Retrievably storing in memory for each assessment item the task description;

d. Retrievably storing in memory a predefined skill level showing the level of skill required for the task under assessment;

e. Retrievably storing in memory a reading level to which the assessment item is directed.

3. A method for a teacher or other user to systematically create and comprehensively analyze a test having a plurality of assessment items, in a course of study, on a computer system having display means, memory means, and input means, comprised of the steps of:

a. User selecting a desired taxonomy system having a plurality of taxonomies defining classes of behavior relating to learning, performance or achievement pertaining to the course of study;

b. Storing in memory a plurality of assessment items having a similar characteristic of either all multiple choice, all long answer, or all performance rated;

c. For each assessment item, retrievably storing in memory the appropriate answer for each assessment item, the appropriate taxonomy code which pertains to the behaviors which the respective assessment item addresses, a task description, a skill level, a task importance code, a special instruction indicating the materials needed for responding to the assessment item;

d. Analyzing the test by generating a report showing the relationship between the preselected taxonomies, codes and the assessment items to which the taxonomies and codes are assigned.

4. The method in claim 1 having the additional step of retrievably storing in memory a predetermined task importance code pertaining to each assessment item.

5. The method in claim 1 having the additional step of storing in memory for each assessment item a special instruction containing the materials needed to answer the assessment item such that the special instruction for all assessment items in a desired test can be generated at the time the test is to be taken.

6. The method in claim 1 having the additional step of retrievably storing in memory for each assessment item an occupational code that defines one or more occupations to which the assessment relates.

7. A method for a teacher or other user to systematically create and comprehensively analyze a test, and track results in a course of study or job, using a computer system having display means, memory means, and input means, said test having a plurality of assessment items, comprised of the steps of:

a. User selecting a desired taxonomy system having a plurality of taxonomies defining classes of problem-solving aspects or behaviors, each taxonomy having a classification of taxonomy codes defining a range of values;

b. Storing in memory an assessment item;

c. For each assessment item storing in memory the appropriate taxonomy code for each taxonomy in the system that pertain to the abilities which the respective assessment item addresses through its directive or constructed problem;

d. For each assessment item storing in memory a correct response to the assessment item;

e. Repeatedly storing in memory the assessment item, the appropriate taxonomy codes, and the appropriate answers for each assessment item, to create an entire test, and so as to allow retrieval of all answer and coded information for each assessment item;

f. Analyzing the test by generating a report showing the relationship between the preselected taxonomy, taxonomy codes and each assessment item to which the taxonomy codes are assigned, formatted in such a manner that an integration level of problem-solving behaviors can be identified by the user as a means of further analyzing the functionality of test items in the realm of complex thought.

\* \* \* \* \*